May 17, 1960

H. S. MILAM 2,936,618

APPARATUS FOR MEASURING RATE OF FLOW AND
OIL AND WATER PRODUCTION OF WELLS

Filed Jan. 13, 1958

Hinman S. Milam
INVENTOR.

ATTORNEY

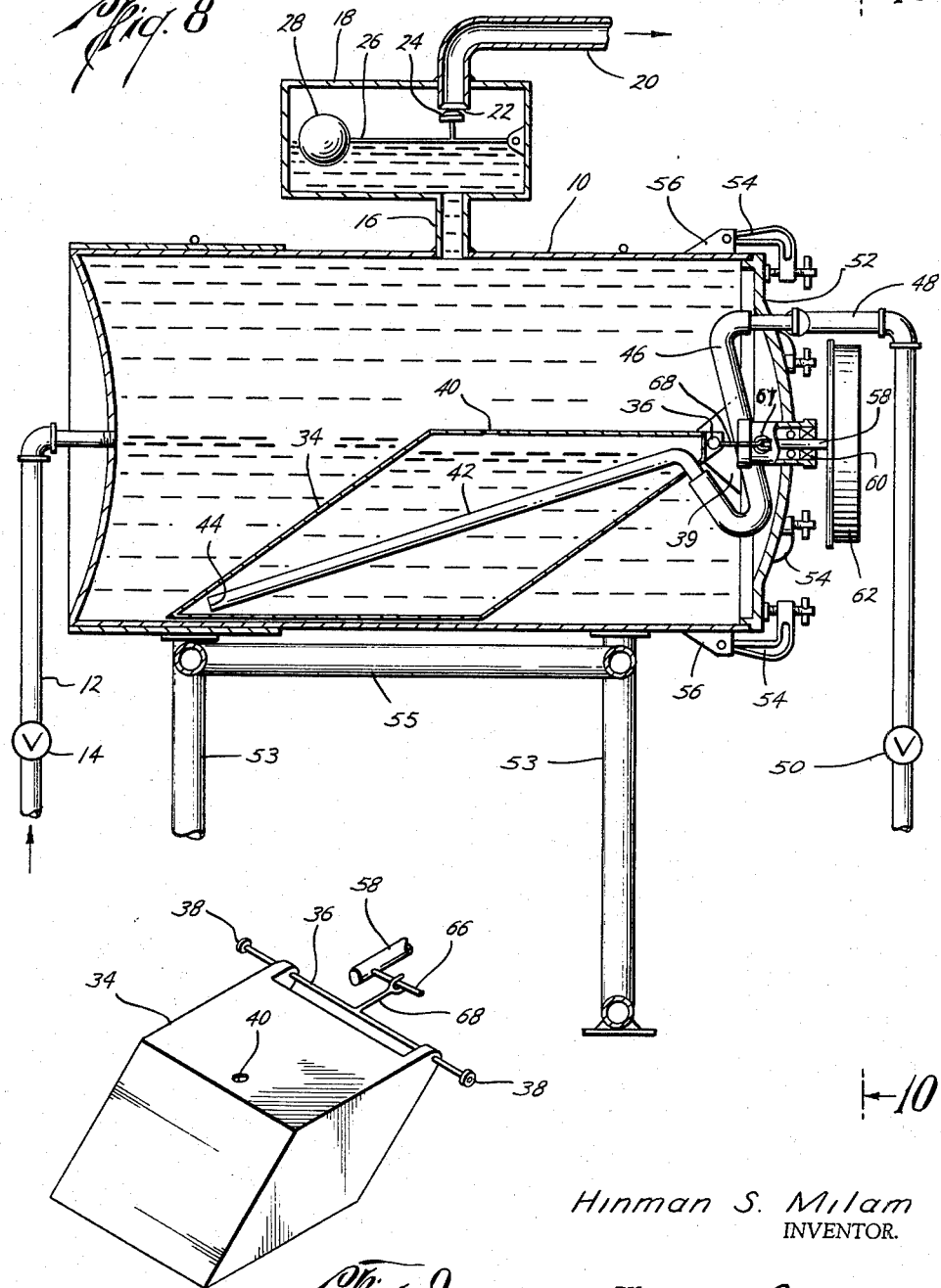

May 17, 1960
H. S. MILAM
2,936,618
APPARATUS FOR MEASURING RATE OF FLOW AND
OIL AND WATER PRODUCTION OF WELLS
Filed Jan. 13, 1958
4 Sheets-Sheet 3
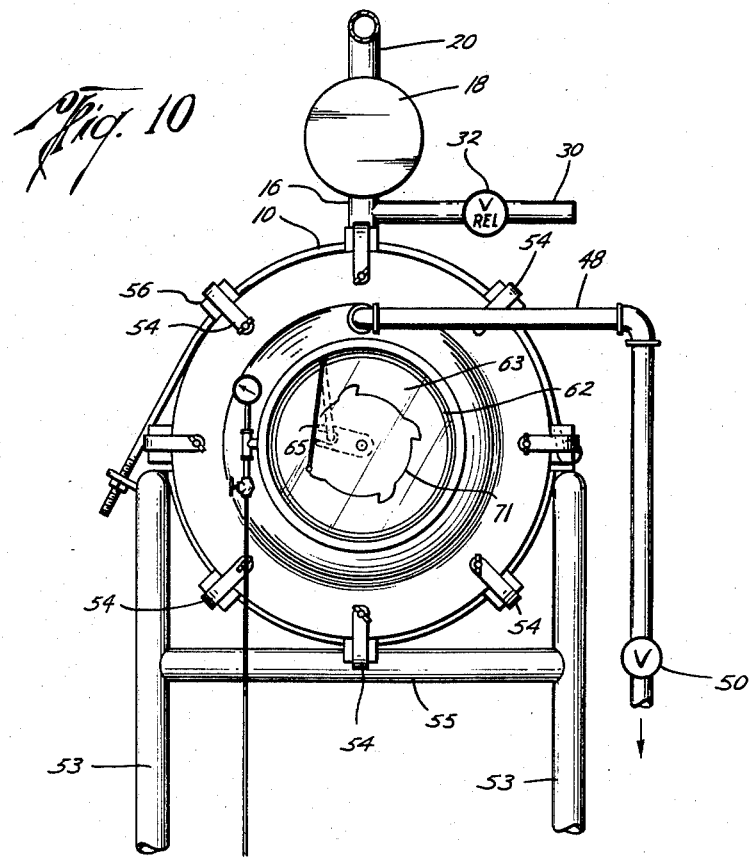
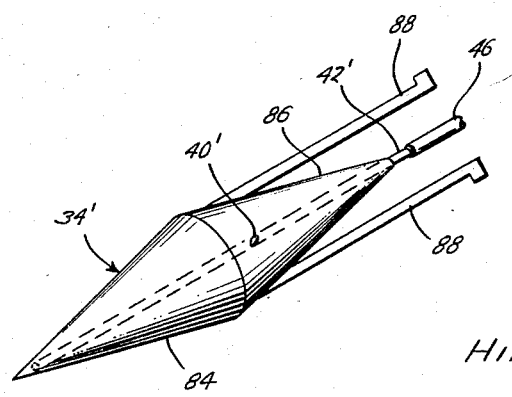
Hinman S. Milam
INVENTOR.
BY
ATTORNEY

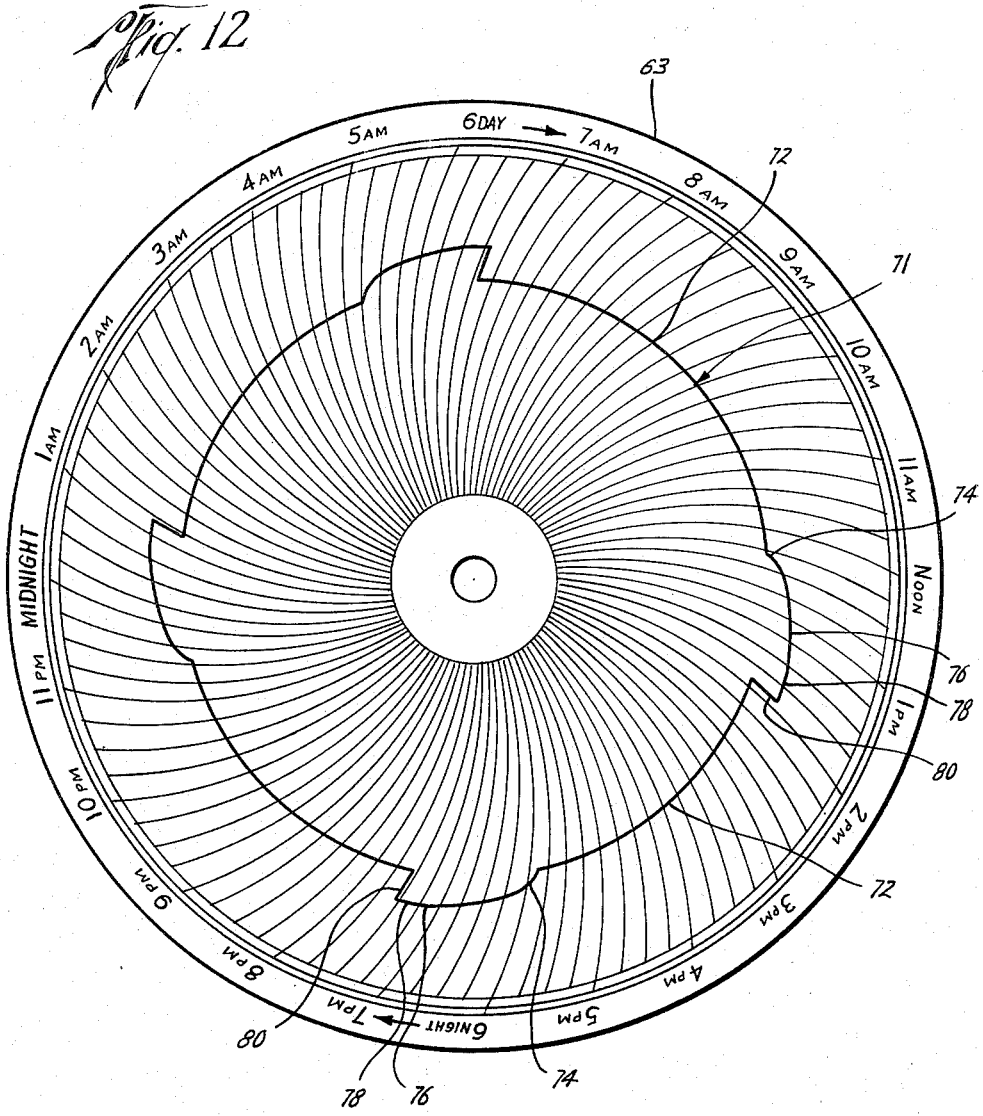

United States Patent Office 2,936,618
Patented May 17, 1960

2,936,618

APPARATUS FOR MEASURING RATE OF FLOW AND OIL AND WATER PRODUCTION OF WELLS

Hinman S. Milam, Chelsea, Okla.

Application January 13, 1958, Serial No. 708,422

7 Claims. (Cl. 73—194)

This invention relates to apparatus for use with immiscible liquids of different densities for measuring and recording the total flow of liquid, the rate of flow and the amount of each of two such liquids flowing through a conduit.

While not limited to such use the invention finds particular application in connection with the production of oil wells for recording the total production, as well as the rate of flow and the ratio of oil to water in the fluid from such wells.

In the production of oil wells the fluid which flows from such wells usually contains both oil and water and the total amount of flow of the well fluid as well as the rate of flow and the ratio of water to oil may vary widely.

Various methods have been proposed heretofore for measuring the amounts or proportions of oil and water in the production fluid from wells, such as by the taking of periodic samples, or allowing the fluid to accumulate and stand in a tank, and measuring the amounts of oil and water which separate. The sampling method, however, is troublesome and laborious, and unless the samples are taken at close intervals does not afford a continuous record of the variations which may take place in the condition of the production fluid. The measurement of flow and oil to water ratio of the fluid by allowing the same to accumulate in tanks is time consuming and requires storage of the fluid throughout a relatively long period of time, thus interfering with the rapid distribution of the valuable products of the well.

The present invention has for an important object the provision of apparatus for measuring and recording the amount of flow of two immiscible liquids flowing through a conduit, the rate of flow of the liquids and the proportion of each of the same.

Another object of the invention is to provide a metering device for liquids which is adapted to be connected into a flow line through which two immiscible liquids flow and which operates to record the total volume of liquid and the amounts and proportions of each of the immiscible liquids flowing through the line.

A further object of the invention is the provision of a metering device for immiscible liquids embodying a container into which the liquids may flow and in which the liquids may be allowed to separate to form an interface between them, and means for causing the liquids above and beneath the interface to be alternately discharged from the container.

Another object of the invention is to provide a metering device for immiscible liquids embodying a container into which the liquids to be metered may flow and in which the liquids may separate to form an interface between them and means movably mounted in the container for vertical movement therein in response to the rise and fall of said interface and through which liquid may flow from the container.

A further object of the invention is the provision of a metering device for flowing immiscible liquids comprising means for causing the liquids to separate to form an interface and means operable in response to the rise and fall of the interface to alternately interrupt the flow of each of the separated liquids.

Another object of the invention is to provide a metering device for immiscible liquids comprising a container into which the liquids may flow and in which the liquids may separate to form an interface, a receptacle movably mounted in the container for vertical movement therein and having an inlet through which liquid in the container may enter the receptacle and an outlet, said inlet being positioned to permit liquid in the container beneath the interface to enter the receptacle when the interface rises to a predetermined upper level in the container and to permit liquid in the container above the interface to enter the receptacle when the interface falls to a predetermined lower level in the container.

A further object of the invention is the provision of a metering device for immiscible liquids comprising a container into which the liquids may flow and in which the liquids may separate to form an interface, a receptacle movably mounted in the container for vertical movement therein and having an inlet through which liquid in the container may enter the receptacle and an outlet, said receptacle being movable downwardly in the container when filled with liquid from beneath said interface and movable upwardly in the container under the influence of the buoyancy of the liquid from above the interface when a predetermined volume of the liquid in the receptacle from beneath the interface has been displaced by liquid from above the interface.

Another object of the invention is to provide metering apparatus for immiscible liquids comprising a container into which the liquids may flow and in which the liquids may separate to form an interface, outlet means movably disposed in the container for vertical movement therein and through which liquid may flow from the container and means responsive to a rise in the level of said interface to move said outlet means to a position to permit the outflow therethrough of liquid from above the interface and to a fall in the level of said interface to move the outlet means to a position to permit the outflow therethrough of liquid from below said interface.

The above and other important objects and advantages of the invention may best be understood from the following detailed description, constituting a specification of the same, when considered in conjunction with the annexed drawings, wherein—

Figure 1 is a side elevational view, somewhat diagrammatic, illustrating a preferred embodiment of the invention and showing the relationship of the parts at one stage of the cycle of operation of the apparatus;

Figures 2 to 7, inclusive, are views similar to that of Figure 1, on a somewhat reduced scale, illustrating successive stages of the cycle of operation of the apparatus;

Figure 8 is a vertical, central, cross-sectional view of the invention, showing details of construction and arrangement of the parts thereof;

Figure 9 is a perspective view of the receptacle or float member of the invention as illustrated in Figure 8 showing the same separated from the surrounding parts of the apparatus;

Figure 10 is an end elevational view of the invention as illustrated in Figure 8, looking at the right end of the apparatus as shown in that figure;

Figure 11 is a perspective view, similar to that of Figure 9, illustrating a somewhat different form of the receptacle or float member of the invention; and Figure 12 is a front view of a chart illustrating the manner in which the proportions of oil and water are recorded by the apparatus and how the rate and amount of flow are indicated.

Figure 1:
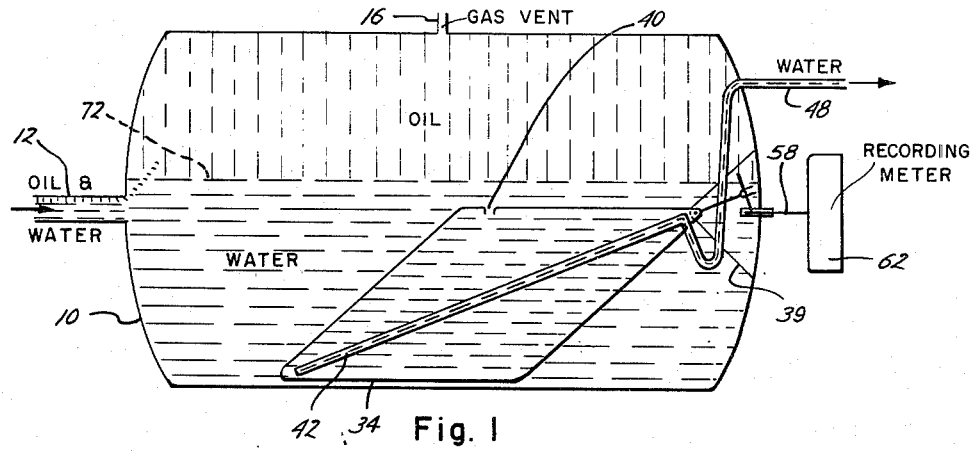

Referring now to the drawings in greater detail, the invention is illustrated herein primarily in connection with its use in recording the proportions of oil and water in the production fluid of an oil well. In the drawings the numeral 10 designates a container, such as a tank, having an inlet pipe 12 which is preferably located to permit the fluid whose condition is to be recorded to enter the tank at a point intermediate the top and bottom of the tank. The inlet pipe 12 may be provided with suitable means, such as a valve, indicated at 14 for controlling the inflow of fluid into the tank.

The tank 10 is also provided with a discharge pipe 16 through which gas escaping from the fluid entering the tank may be discharged through any suitable vent means such as conventional gas or steam trap, which includes the fluid chamber 18, connected in communication with the discharge pipe 16 and having an outlet pipe 20, whose inner end within the chamber is formed with a valve seat 22, positioned to be opened and closed by a valve 24 carried by a float arm 26 pivotally supported in the chamber and to which a float 28 is attached. Liquid in the tank 10 may enter the chamber 18, through the discharge pipe 16 and rise therein to a level to cause the float 28 to move the valve 24 into closing contact with the seat 22, and as the gas escaping from the liquid accumulates in the chamber the level of the liquid therein will be depressed to cause the float 28 to move the valve 24 to open position to permit the gas to be discharged through the pipe 20.

A branch pipe 30 may also be provided for the discharge pipe 16, which pipe has a relief valve 32 of usual type designed to open when the pressure in the tank exceeds a predetermined value.

Within the tank 10 a hollow receptacle or float 34 is positioned, which is supported for vertical swinging movement by a shaft 36, journalled in suitable bearings such as those indicated at 38, suitably supported on the tank, as by means of spaced apart internal lugs or flanges 39, whereby the shaft 36 will be rotated upon vertical movement of the float.

The receptacle or float 34 may be of any desired shape, but is preferably elongated and of generaly rhomboidal configuration in cross-section, in order to obtain a maximum volume within the float and at the same time to permit a maximum vertical movement of the float within the tank. The receptacle 34 is provided with an upper inlet opening 40, through which fluid in the tank may enter the receptacle. The receptacle also has an outlet pipe 42 therein, whose inner end 44 opens into the receptacle at a point close to the free end of the receptacle, and which extends through the wall of the receptacle, and is connected by a flexible tube 46 to a discharge pipe 48 leading to the exterior of the tank. The discharge pipe 48 may be provided with suitable means such as a valve 50 for controlling the outflow of fluid therethrough from the float 34.

The tank 10 may for convenience be closed at one end by a closure or lid 52, which is removably held in place by screw clamps 54, hingedly connected to the body of the tank by means of pairs of spaced external lugs 56, whereby the closure may be clamped in place on the tank or removed therefrom.

The tank may be supported on a suitable framework having uprights 53 which are tied together by cross ties 55, whereby the tank may be supported in an elevated level position.

Means is provided for recording the vertical movements of the float, which means is illustrated in Figures 8 and 10, and may take the form of a rotatable shaft 58, which passes through, and is journalled in, a bearing housing 60 located centrally of the closure 52, and extends into a casing 62, within which suitable means such as a recording pen 65 is operably connected to the shaft for movement therewith to record the movements of the shaft on a chart 63 also rotatably mounted in the casing and which is rotated by any suitable means such as clockwork or the like, not shown. The shaft 58 has near its inner end a side arm 66 extending through a suitable opening 67 in bearing housing 60 and positioned for engagement by a Y-shaped arm 68 carried by the shaft 36. Rocking arm 68 is movable vertically in response to vertical movement of the float to cause the shaft 58 to rock or oscillate accordingly.

In the above described arrangement it will be apparent that all of the moving parts of the recording mechanism and the means by which the same is operated are supported on the closure 52 and may be conveniently removed with the same as a unit for purposes of replacement and repair.

The chart 63, as best seen in Figure 12, may conveniently be of a conventional type, marked with radiating lines to provide divisions representing hours, which may be further divided, if desired, to represent fractions of hours or minutes. The pen 65 is pivotally mounted on the casing 62 and is connected by suitable mechanism, such as a link 67 to an arm 69 attached to the shaft 58 for movement therewith upon rotation of the arm to move the pen radially of the chart to record the movement of the float 34 by marking a line, such as that shown at 71 on the chart as the chart rotates. The vertical movement of the float 34 is thus plotted by the radial movement of the pen 65 against the rotation of the chart which represents time.

In operation of the apparatus the well fluid or other fluid having two immiscible components is supplied to the tank 10 through the inlet pipe 12. As the two immiscible liquids enter the tank they separate, the lighter liquid floating on the heavy. Consider the float in its lowermost position and filled with the heavier liquid. The heavy liquid is discharged from the tank through the pipe 42 while the lighter liquid collects in the tank.

When a sufficient amount of the lighter liquid has collected so that it covers the inlet opening 40, the float begins to fill with the lighter liquid while being surrounded by the heavy liquid, the float becomes buoyant, begins to rise and the lighter liquid is then discharged through the pipe 42.

As the lighter liquid is discharged from the tank, the heavy liquid collects in the tank and the interface between the two liquids rises. Due to the buoyancy of the float when partially filled with the lighter liquid the float rises, following the interface and maintaining the inlet opening 40 in the lighter liquid. As the lighter liquid continues to be discharged from the tank the interface rises until both heavy and light liquid flow into the float, with the heavier liquid settling to the lower part of the float. When sufficient heavy liquid has entered the float, the buoyancy of the float decreases and the float moves downwardly to its lowermost position. The heavier liquid then again flows out of the tank through the float and the cycle is repeated.

Assuming that the interface 72 is at the level shown in Figure 1 and the float 34 is filled with water, then the float will be in its lowermost position.

Figure 2:
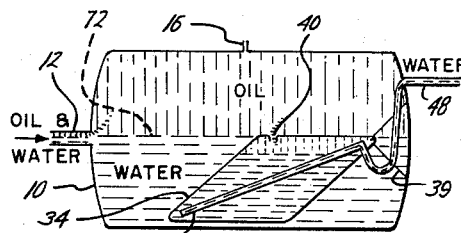

As the fluid continues to pass through the apparatus, oil separates from the water and accumulates in the top of the tank, causing the interface to move downwardly, as seen in Figure 2, until the interface moves below the level of the opening 40 of the float, whereupon oil and water enter the float, oil accumulates in the top of the float and water continues to pass out through the pipe 42.

Figure 3:
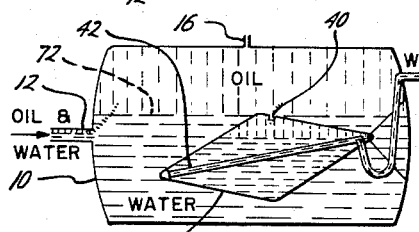
Figure 4:
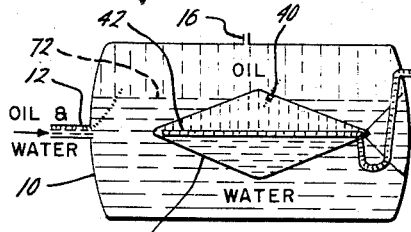

When sufficient oil has accumulated in the float, as seen in Figure 3, the buoyancy of the float is increased to cause the float to move upwardly so that the opening 40 remains above the interface and additional oil enters the float as shown in Figure 4.

Figure 5:
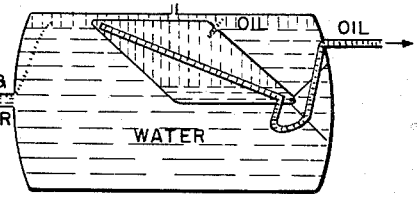
Figure 6:
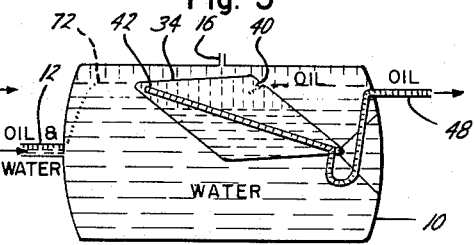
Figure 7:
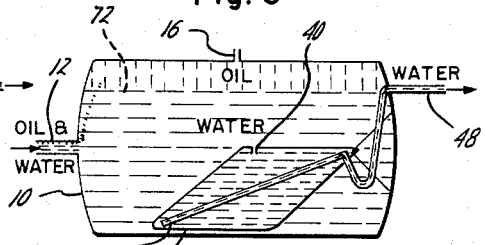

When the float reaches its uppermost position, as shown in Figure 5, it remains stationary until the level of the water reaches the opening 40, whereupon oil and water may enter the float and separate, as seen in Figure 6, until water has accumulated in the float to cause the buoyancy to be reduced to the extent that the float moves downwardly to its lowermost position as seen in Figure 7. The float then remains in its downmost position until oil in the tank has again accumulated to an extent to again enter the float as shown in Figure 1, whereupon the above described cycle of operation is repeated.

During the time that the float is in its lowermost position, the pen 65 will be in its innermost position radially on the chart 63, so that it will describe a circular path on the chart as shown at 72. This circular path continues until the oil has accumulated in the float to a sufficient extent to cause the float to move upwardly, whereupon the pen starts to move radially outwardly on the chart, as seen at 74, such outward movement being abrupt at its commencement and more gradual with the upward movement of the float due to increased buoyancy and rise of the interface, as indicated at 76. When the float reaches its uppermost position, the pen then describes a circular path shown at 78 on the chart until water has accumulated in the float to a sufficient extent to cause the float to sink, whereupon the float moves downwardly and the pen is moved abruptly radially inwardly on the chart to form the line portion 80 thereon. On again reaching its lowermost position the float remains stationary to cause the pen to repeat the circular path 72 until oil again accumulates in the float to start the upward movement of the float.

To determine the ratio of oil to water in the fluid which flows through the tank the following formula is employed:

$$\frac{oil}{water} = \frac{T}{T^1}$$

The time, $T$, required for the float to rise from the bottom of the tank to the top, and again sink to the bottom will be the time required for the predetermined or metered quantity of water to enter the tank from the moment the float becomes buoyant and starts to rise. The time, $T^1$, during which the float remains on the bottom of the tank is the time needed for a predetermined or metered quantity of oil to enter the tank. The metered quantity of water will be exactly equal to the metered quantity of oil.

Thus, if $T=30$ minutes and $T^1=90$ minutes then $$\frac{oil}{water} = \frac{30}{90} = \frac{1}{3}$$

or the fluid which flows through the tank is made up of 3 parts of water and 1 part of oil.

The oil, expressed as percentage of total flow is:

$$oil = \frac{T}{T+T^1} \times 100 = 25\%$$

The ratios of the liquids as calculated from the recording of the operation of the apparatus will always be exact and no calibration of the apparatus or care in positioning of the same is necessary.

In order to determine the rate of flow of fluid through the apparatus the apparatus must first be calibrated. To accomplish this the tank is set level so that the axis of the float bearings will be horizontal. The tank and float are then completely filled with water. Oil is then supplied to the tank through the inlet pipe 12, and water permitted to exhaust through pipe 48 until the float starts to rise from the bottom of the tank. After the first upward movement of the float from the bottom of the tank, water is admitted to the tank while oil is exhausted from the tank and the amount of water thus added to cause the float to rise to the top of the tank and then sink again to the bottom is measured. This amount of water will be the predetermined or metered quantity, hereinafter designated K. The rate of flow may then be determined by the following formula:

$$Q = \frac{2K}{T+T^1}$$

Thus, if $T$ is 30 minutes, $T^1=90$ minutes and $K=40$ gallons, then $$Q = \frac{2 \times 40}{30+90} = .67 \text{ gallon per minute}$$

Greater accuracy may be obtained by adding the times obtained from repeated operations of the apparatus, using the same number of cycles to obtain $T$ as are used to obtain $T^1$.

In Figure 11 there is illustrated a somewhat modified form of the float comprising a hollow body 34' made up of conically shaped sections 84 and 86, joined together at their bases, and provided with arms 88 by which the float is hingedly connected to the tank in the same manner as the float 34, previously described, the float 34' is provided with an inlet opening 40' similar to the opening 40, previously described, and similarly located. An outlet pipe 42' is provided for the float 34' similar to the outlet pipe 42, previously described, and connected to the flexible pipe 46 in the same manner as the pipe 42. In other respects the float 34' is similar to the float 34 and operates in the same manner.

It will thus be seen that the invention, constructed and arranged as described above, provides apparatus for measuring and recording rate of flow and the proportions of two immiscible liquids flowing through a conduit, without interruption of the flow of the liquids, and which apparatus is of simple design and rugged construction.

The invention has been disclosed herein in connection with certain specific embodiments of the apparatus, but it will be understood that this is intended by way of illustration only and that numerous changes can be made in the construction and arrangement of the various parts within the spirit of the invention and the scope of the appended claims.

The principle of operation of this invention may be readily applied to mixtures of gas and liquid; to measurement of rate of flow and volume of a single liquid; and the movements of the measuring elements may be employed to control switching devices and the like for controlling flow of fluids to and from other tanks, as well as directing the separated fluids in the illustrative embodiments to different tanks.

Having thus clearly shown and described the invention, what is claimed as new and desired to secure by Letters Patent is:

1. Apparatus for continuously determining the ratio of two immiscible liquids in a mixture of such liquids flowing through a conduit, comprising a container into which the liquids may flow and in which the liquids may separate to form an interface, a hollow float of elongate form mounted in the container and pivoted at one end for vertical movement of the other end about the pivot, said float having an inlet at its upper side intermediate its ends through which liquid in the container may enter the float, outlet means communicating with the interior of the float at a point below the level of the inlet and adjacent said other end of the float, said outlet means being movable vertically with the float for alternately discharging the immiscible liquids separating in the float to the exterior of the container, and means for continuously recording the vertical movements and the stationary positions of said float and the time duration thereof.

2. Apparatus for continuously determining the ratio of two immiscible liquids in a mixture of such liquids flowing through a conduit comprising a container into which the liquids may flow and in which the liquids may separate to form an interface, an elongate hollow receptacle mounted in the container and pivoted at one end for vertical movement of the other end about the pivot, said receptacle having an inlet in its upper side intermediate its ends positioned to admit liquid from the container into the receptacle from beneath said interface when the receptacle is in its lowermost position and from above said interface when the receptacle is in its uppermost position, and outlet means communicating with the interior of the receptacle at a point below the level of the inlet and adjacent said other end of the receptacle, said outlet means being movable vertically with the receptacle for alternately discharging immiscible liquids separating in the receptacle to the exterior of the container to cause downward displacement of said interface when said receptacle is in said lowermost position and to cause upward displacement of said interface when the receptacle is in its uppermost position, and means for continuously recording the vertical movements and the stationary positions of said receptacle and the time duration thereof.

3. Apparatus for continuously determining the ratio of two immiscible liquids in a mixture of such liquids flowing through a conduit, comprising a container into which the liquids may flow and in which the liquids may separate to form an interface, an elongate hollow receptacle mounted in the container and pivoted at one end for vertical movement of the other end about the pivot, said receptacle having an inlet in its upper side through which liquid may flow from the container into the receptacle, means forming a discharge outlet in the receptacle positioned adjacent said other end and to be below said inlet in all positions of the receptacle in the container, and through which liquid may flow from the receptacle to the exterior of the container, said receptacle being movable upwardly under the influence of the buoyancy of liquid from above said interface when the amount of the same in the receptacle exceeds a predetermined amount and being movable downwardly under the influence of gravity when the amount of the liquid from above said interface in the receptacle falls below said predetermined amount, and means for continuously recording the vertical movements of the receptacle with respect to time and the time during which the receptacle is in its lowermost and in its uppermost positions in the container.

4. Apparatus for continuously determining the ratio of two immiscible liquids in a mixture of such liquids and the total volume of the mixture which flows through a conduit, comprising a container into which the liquids may flow and in which the liquids may separate to form an interface, an elongate hollow receptacle mounted in the container and pivoted at one end for vertical movement of the other end about the pivot, said receptacle having an inlet in its upper side through which liquid may flow from the container into the receptacle, means forming a discharge outlet in the receptacle adjacent said other end at a location below said inlet and through which liquid may flow from the receptacle to the exterior of the container, said receptacle being movable upwardly under the influence of the buoyancy of the lighter of said liquids to move said inlet above said interface when the amount of said lighter liquid in the receptacle exceeds a predetermined amount and being movable downwardly under the influence of gravity to move the inlet below said interface when the amount of said lighter liquid in the receptacle falls below said predetermined amount, and means for recording the time during which the receptacle is in its uppermost and lowermost positions and during which the receptacle is in a position intermediate said uppermost and lowermost positions in the container.

5. Apparatus for continuously determining the ratio of two immiscible liquids in a mixture of such liquids which flows through a conduit, comprising a container into which the liquids may flow and in which the liquids may separate, an elongated receptacle mounted in the container and pivoted at one end for vertical swinging movement of the other end about an axis substantially normal to the longitudinal axis of the container and having an inlet in its upper side through which liquid may flow from the container into the receptacle, means forming a discharge outlet in the receptacle positioned below said inlet and adjacent said other end through which liquid may flow from the receptacle to the exterior of the container and means for continuously recording the vertical movements of said receptacle with respect to time and the time during which the receptacle is in its uppermost and lowermost positions in the container.

6. Apparatus for continuously determining the ratio of two immiscible liquids in a mixture of such liquids and the total volume of the mixture which flows through a conduit, comprising a container into which the liquids may flow and in which the liquids may separate, an elongated receptacle mounted in the container and pivoted at one end for vertical swinging movement of the other end about an axis normal to the longitudinal axis of and adjacent one end of the container, said receptacle having an inlet in its upper side through which liquid may flow from the container into the receptacle, means forming a discharge outlet in the receptacle adjacent the other end of the receptacle located below said inlet and through which liquid may flow from the receptacle to the exterior of the container and means for continuously recording the vertical movements of the receptacle with respect to time and the time during which the receptacle is in its uppermost and lowermost positions in the container.

7. Metering apparatus for continuously determining the ratio of two immiscible liquids of different densities in a mixture of such liquids flowing through a conduit, comprising, a container adapted to continuously receive said mixture and effect separation thereof into upper and lower layers defining an interface therebetween, a hollow float member of generally elongate shape mounted in the container and pivoted at one end to swing the other end between upper and lower limiting positions in said container adapted to maintain the float member submerged in said liquids, said float member having an inlet in its upper side communicating with the interior of the container and an outlet conduit communicating with the interior of the float member adjacent said other end and with the exterior of the container, whereby all of the fluids entering the container are constrained to discharge therefrom through the interior of said float member, said float member being alternately movable to said limiting positions in response to changes in its buoyancy relative to the surrounding liquid produced by the alternate displacement through said float member of one of said liquids by the other, whereby to alternately discharge unit volumes of said liquids from the upper and lower layers when the float member is in the respective upper and lower positions, and means operable in response to the movement of said float member to continuously record the time of the movements of said float member between said positions and its time of residence at each of said positions.

References Cited in the file of this patent

UNITED STATES PATENTS

| | | |
|---|---|---|
| 1,948,543 | Samiran | Feb. 27, 1934 |
| 2,607,214 | Schlueter | Aug. 19, 1952 |